(12) United States Patent
Takahashi et al.

(10) Patent No.: US 7,770,428 B2
(45) Date of Patent: Aug. 10, 2010

(54) HOT BEND PIPE AND A PROCESS FOR ITS MANUFACTURE

(75) Inventors: Nobuaki Takahashi, Kashima (JP);
Akio Yamamoto, Kashima (JP);
Masahiko Hamada, Kobe (JP)

(73) Assignee: Sumitomo Metal Industries, Ltd., Osaka (JP)

(*) Notice: Subject to any disclaimer, the term of this patent is extended or adjusted under 35 U.S.C. 154(b) by 0 days.

(21) Appl. No.: 12/318,882

(22) Filed: Jan. 12, 2009

(65) Prior Publication Data

US 2009/0199612 A1 Aug. 13, 2009

Related U.S. Application Data

(63) Continuation of application No. PCT/JP2007/063904, filed on Jul. 12, 2007.

(30) Foreign Application Priority Data

Jul. 13, 2006 (JP) .............................. 2006-192839

(51) Int. Cl.
*B21D 9/00* (2006.01)
(52) U.S. Cl. ...................... 72/369; 72/342.5; 72/364
(58) Field of Classification Search ................ 72/342.1, 72/342.2, 342.5, 364, 367.1, 368, 369, 700; 148/505, 506, 519, 590, 592

See application file for complete search history.

(56) References Cited

U.S. PATENT DOCUMENTS

2004/0031544 A1* 2/2004 Hara et al. .................. 148/521

2004/0089701 A1* 5/2004 Tezuka ...................... 228/233.2
2007/0051433 A1* 3/2007 Kamo et al. ................ 148/332
2008/0283160 A1* 11/2008 Takahashi et al. ........... 148/593

FOREIGN PATENT DOCUMENTS

| JP | 4-154913 | 5/1992 |
| JP | 5-67699 | 9/1993 |
| JP | 7-3330 | 1/1995 |
| JP | 8-92649 | 4/1996 |
| JP | 9-295067 | 11/1997 |
| JP | 2001-340990 | 12/2001 |

(Continued)

*Primary Examiner*—Edward Tolan
(74) *Attorney, Agent, or Firm*—Clark & Brody

(57) ABSTRACT

A high-strength hot bend pipe which has a balance between an excellent strength of at least X70 grade and toughness and which has excellent tensile properties and a weld metal with excellent low temperature toughness is manufactured. A UOE steel pipe having a base metal with a composition of C: 0.03-0.12%, Si: 0.05-0.50%, Mn: 1.4-2.2%, S: at most 0.01%, Al: at most 0.06%, N: at most 0.008%, and a remainder of Fe and impurities, with the carbon equivalent (Ceq) being at most 0.36% and the weld cracking parameter (Pcm) being at most 0.22%, and having a weld metal with a weld cracking parameter (Pcm) of at most 0.28%, a B content of at most 5 ppm, and an O content of at most 280 ppm is heated to a temperature range of 900-1100° C. and subjected to bending, and then is immediately cooled to a temperature range of 300° C. or lower at a cooling rate of at least 3° C./sec, and then is tempered in a temperature range of 300-500° C.

18 Claims, 1 Drawing Sheet

FOREIGN PATENT DOCUMENTS

| | | | |
|---|---|---|---|
| JP | 2001-342545 | | 12/2001 |
| JP | 2003-33876 | * | 2/2003 |
| JP | 2003-277831 | * | 10/2003 |
| JP | 2005-330513 | * | 12/2005 |
| JP | 2005-350724 | | 12/2005 |

* cited by examiner

HOT BEND PIPE AND A PROCESS FOR ITS MANUFACTURE

This application is a continuation of International Patent Application No. PCT/JP2007/063904, filed Jul. 12, 2007. This PCT application was not in English as published under PCT Article 21(2).

TECHNICAL FIELD

This invention relates to a hot bend pipe and a process for its manufacture. Specifically, the present invention relates to a hot bend pipe which is formed from a welded steel pipe having a weld extending in its axial direction, which has a strength of at least API X70 grade, and which has a weld metal with excellent low temperature toughness. It also relates to a process for manufacture of such a hot bend pipe.

BACKGROUND ART

In recent years, there has been an increasing demand for cost reductions in pipelines. As manufacturing techniques have progressed, high-strength steel pipes have come to be used in pipelines. The majority of high-strength steel pipes (straight pipes) used in pipelines have a strength up to API X70 grade. Only a few high-strength steel pipes of API X80 grade have been put to use worldwide. In particular, hot bend pipes which are manufactured by carrying out bending of a welded steel pipe having a weld extending in its axial direction are indispensable in the construction of actual pipelines. However, it is extremely difficult to guarantee both strength and toughness in welds by heat treatment performed after bending. Therefore, manufacturing techniques for high-strength hot bend pipes of at least API X70 grade have not been established.

Patent Document 1 discloses an invention for manufacturing a thick-walled high-strength hot bend pipe having a low weld cracking parameter Pcm by heating a thick-walled welded steel pipe having a specific composition such that the weld cracking parameter Pcm is at most 0.19% (in this description, unless otherwise specified, percent means mass percent) to a temperature of at least the $Ac_3$ point to at most 1100° C., performing bending of the pipe at this temperature, then cooling the pipe at a specific cooling rate to 300° C. or below, and then tempering the pipe in a temperature range of at least 550° C. to at most 650° C.

Patent Document 2 discloses an invention for manufacturing a high-strength hot bend pipe having a weld metal with excellent toughness by heating a welded steel pipe having a weld metal in which the value of [{1.5(O–0.89Al)+3.4N}–Ti] (wherein O, Al, N, and Ti are respectively the contents of oxygen, aluminum, nitrogen, and titanium) is in the range of at least –0.010 to at most 0.010 to a temperature of at least 900° C. to at most 1000° C. immediately followed by rapid cooling while performing bending.

Patent Document 1: JP H05-67699 B
Patent Document 2: JP H09-295067 A

DISCLOSURE OF INVENTION

In the inventions disclosed in Patent Documents 1 and 2, it is extremely difficult to guarantee the yield strength on the inner side of a bend, which is the side which undergoes compressive deformation (herein referred to as the underside). It is true that it is necessary to reduce Pcm and to optimize the composition in order to guarantee the low temperature toughness of the weld metal, but if tempering is not carried out after bending, it is difficult to guarantee the yield strength of the underside of a hot bend pipe.

If tempering is carried out at a temperature as high as 500° C. or above, the tensile strength decreases. In order to compensate for the decrease in tensile strength, it becomes necessary to increase the content of alloying elements in the base metal of a hot bend pipe, leading to an increase in material costs and thus making it difficult to use the hot bend pipe for line pipe.

In addition, if it is attempted to increase strength, it becomes difficult to guarantee the low temperature toughness of the weld metal of a hot bend pipe.

The object of the present invention is to provide a hot bend pipe capable of achieving the desired toughness of the weld metal and the yield strength of the underside of the bend, which are important properties for a hot bend pipe, while maintaining good strength and low temperature toughness of a base metal, and a process for manufacturing the hot bend pipe.

The present invention is based on findings that the above objects can be achieved by the following:

(i) after bending of a welded steel pipe, subjecting the pipe to tempering in a low temperature range of at least 300° C. to at most 500° C., namely, to aging, (ii) using a welded steel pipe having a base metal with a suitable carbon equivalent Ceq and weld cracking parameter Pcm (such as a UOE steel pipe or a weld pipe for roll bending (referred to below as an RB pipe)) as a material for bending, and (iii) providing a weld metal with high toughness which is achieved by welding using a highly basic boron-free flux.

The present invention is a hot bend pipe which is manufactured by performing bending of a welded steel pipe and which has a quenched and tempered structure obtained by cooling after the bending at a cooling rate of at least 3° C. per second to a temperature range of 300° C. or lower and then tempering in a temperature range of 300-500° C., characterized in that the base metal has a composition of C: 0.03-0.12%, Si: 0.05-0.50%, Mn: 1.4-2.2%, S: at most 0.0050%, Al: at most 0.06%, N: at most 0.0070%, preferably one or more of Cu: at most 1.0%, Ni: at most 2.0%, Cr: at most 1.0%, Mo: at most 1.0%, Nb: at most 0.1%, V: at most 0.1%, and Ti: at most 0.03%, more preferably B: at most 0.0030%, more preferably Ca: at most 0.005%, and a remainder of Fe and impurities, with the carbon equivalent (Ceq) defined by Equation (1) being at least 0.36% and the weld cracking parameter (Pcm) defined by Equation (2) being at most 0.22%, and the weld metal has a weld cracking parameter (Pcm) defined by Equation (2) of at most 0.30%, a B content of at most 5 ppm, and an oxygen content of at most 300 ppm.

$$Ceq = C + \frac{Mn}{6} + \frac{Cr + Mo + V}{5} + \frac{Cu + Ni}{15} \quad (1)$$

$$Pcm = C + \frac{Si}{30} + \frac{Mn}{20} + \frac{Cu}{20} + \frac{Ni}{60} + \frac{Cr}{20} + \frac{Mo}{15} + \frac{V}{10} + B \quad (2)$$

From another standpoint, the present invention is a process for manufacturing a hot bend pipe characterized by bending a welded steel pipe such as a UOE steel pipe or an RB pipe having a base metal and a weld metal which satisfy the above-described conditions after heating to a temperature of at least 900° C. to at most 1100° C., then immediately cooling the pipe to a temperature range of 300° C. or lower at a cooling rate of at least 3° C./sec, and then subjecting the pipe to tempering in a temperature range of at least 300° C. to at most 500° C.

According to the present invention, a decrease in the yield strength of the underside of a bend and a decrease in strength and toughness, which are problems from the standpoint of performance of a high-strength hot bend pipe, can be suppressed. As a result, it is possible to provide a high-strength hot bend pipe which has a balance between an excellent strength of at least API X70 grade and toughness and which is improved in tensile strength and in the low temperature toughness of a weld metal. Namely, the hot bend pipe has a base metal with good strength and toughness while solving the problem of a decrease in the toughness of the weld metal and a decrease in the yield strength of the underside of a bend, which are problems of a hot bend pipe.

BEST MODE FOR CARRYING OUT THE INVENTION

Figure 1:
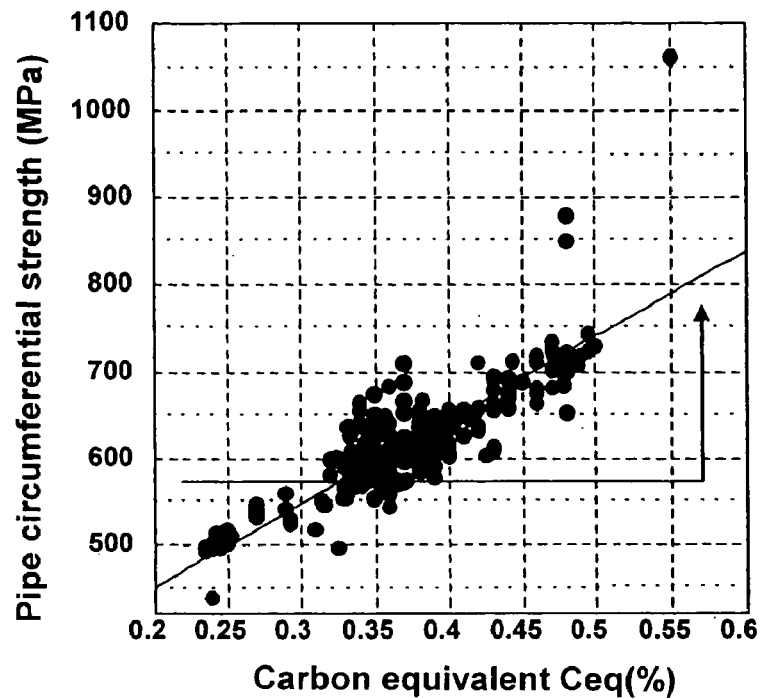
FIG. 1 is a graph showing the relationship between the carbon equivalent Ceq (%) and the strength in the circumferential direction of a pipe (MPa).

Below, the best mode for carrying out a process for manufacturing a hot bend pipe according to the present invention will be explained in detail while referring to the attached drawings.

In this embodiment, a welded steel pipe having a weld extending in the axial direction, such as a UOE steel pipe or an RB pipe, is used as a material for forming a hot bend pipe.

As is well known, a UOE steel pipe refers to a large-diameter welded steel pipe which is manufactured by bending a raw material in the form of a plate into the shape of a U using a high capacity press in a cold state, then forming a circular cross section by an O press, and then welding the joint from the inner and outer surfaces by the automatic submerged arc process. An RB pipe refers to a large-diameter welded steel pipe which is manufactured by forming a raw material in the form of a plate into a circular cross section using an end bending press and a roll bender and then welding the joint from the inner and outer surfaces sequentially using an inner surface welding machine, an outer surface welding machine, an inner surface circumferential welding machine, and an outer surface circumferential welding machine. Both a UOE steel pipe and an RB pipe have a weld extending in the axial direction.

(Base Metal)

The reasons for the limitations on the composition of the base metal of a welded steel pipe used as a material for forming a hot bend pipe will be explained.

C: at least 0.03% to at most 0.12%

C is an element which is effective for increasing strength, so it is contained in an amount of at least 0.03% in order to obtain a strength of at least API X70 grade. However, if the C content exceeds 0.12%, toughness markedly decreases, so it has an adverse effect on the mechanical properties of the base metal, and it promotes the formation of surface flaws in a slab. Therefore, the C content is limited to at least 0.03% to at most 0.12%. The C content is preferably at least 0.04% to at most 0.08%.

Si: at least 0.05% to at most 0.50%

Si is effective as a deoxidizing agent and as a component for strengthening steel. If the Si content is less than 0.05%, deoxidation is insufficient, while if it exceeds 0.50%, a large amount of martensite-austenite constituent is formed in the heat affected zone, and toughness markedly decreases, leading to a decrease in mechanical properties. Therefore, the Si content is limited to at least 0.05% to at most 0.50%. The Si content is preferably at least 0.05% to at most 0.35%. The Si content is preferably determined taking the thickness of the steel plate into consideration.

Mn: at least 1.4% to at most 2.2%

Mn is a fundamental element for increasing the strength and toughness of steel, so it is contained in an amount of at least 1.4% in order to guarantee strength. However, if the Mn content exceeds 2.2%, the toughness of the weld metal deteriorates, and the toughness of the base metal and the heat affected zone after bending also decreases. Therefore, the Mn content is limited to at least 1.4% to at most 2.2%. The Mn content is preferably at least 1.5% to at most 2.0%.

S: at most 0.0050%

S deteriorates the toughness of the base metal if its content exceeds 0.0050%. Therefore, the S content is limited to at most 0.0050%.

Al: at most 0.06%

Like Si, Al also acts as a deoxidizing agent. This effect is adequately obtained if the Al content is at most 0.06%, but if Al is added in excess of 0.06%, its effect saturates and costs merely increase. Therefore, the Al content is limited to at most 0.06%. The Al content is preferably at least 0.010% to at most 0.055%.

N: at most 0.008%

N has the effect of increasing high-temperature strength by forming nitrides with V, Ti, or the like. However, if the N content exceeds 0.008%, it forms carbonitrides with Nb, V, or Ti and brings about a decrease in the toughness of the base metal and the heat affected zone. Therefore, the N content is limited to at most 0.008%. The N content is preferably at most 0.0070%.

The below-described elements may be contained as optional elements.

At least one of Cu: at most 1.0%, Ni: at most 2.0%, Cr: at most 1.0%, Mo: at most 1.0%, Nb: at most 0.1%, V: at most 0.1%, and Ti: at most 0.03%.

These elements may be added in order to improve strength and toughness.

Cu can increase strength without greatly worsening toughness by solid solution strengthening and by improving the structure due to an increase in hardenability. However, if the Cu content exceeds 1.0%, in order to prevent the occurrence of Cu-induced checking, which causes surface flaws in a slab, the slab must be heated at a low temperature and manufacturing conditions are greatly restricted. Therefore, when Cu is contained, its content is preferably limited to at most 1.0%. The Cu content is preferably at least 0.10% to at most 0.50%.

Like Cu, Ni also can increase strength without greatly worsening toughness by solid solution strengthening and by improving the structure due to an increase in hardenability. In addition, Ni acts to suppress a deterioration in the toughness of the base metal and the heat affected zone after bending. However, if the Ni content exceeds 2.0%, costs increase and its addition is no longer practical. Therefore, when Ni is added, its content is preferably limited to at most 2.0%. The Ni content is preferably at least 0.10% to at most 0.60%.

Like Cu and Ni, Cr also increases strength without greatly worsening toughness by solid solution strengthening and by improving the structure due to an increase in hardenability.

However, if the Cr content exceeds 1.0%, the toughness of the heat affected zone decreases. Therefore, when Cr is added, its content is preferably limited to at most 1.0%. The Cr content is preferably at least 0.10% to at most 0.50%.

Mo is effective for increasing the strength of the base metal and the weld metal, and it also provides the effect of suppressing a deterioration in the toughness of the base metal and the heat affected zone after bending. In order to provide these effects with certainty, preferably it is added in an amount of at least 0.05%. However, if Mo is added in excess of 1.0%, the circumferential weldability, which is the weldability when two pipes are abutted and joined by welding on site, and the toughness of the heat affected zone deteriorate. Therefore, when Mo is added, its content is preferably limited to at most 1.0%. The Mo content is preferably at least 0.05% to at most 0.50%.

Nb, V, and Ti have a great effect of increasing strength by precipitation strengthening and increasing hardenability or of improving toughness through crystal grain refinement. However, if the content of these elements is excessive, the toughness of the weld metal decreases. Therefore, when Nb, V, or Ti is added, the contents thereof are preferably limited to Nb: at most 0.1%, V: at most 0.1%, and Ti: at most 0.030%. The content of Ti is preferably at least 0.005% so that it will form TiN and thereby suppress grain growth in the heat affected zone with increasing the toughness thereof. The Nb content is preferably at least 0.010% to at most 0.060%, the V content is preferably at least 0.010% to at most 0.060%, and the Ti content is preferably at least 0.005% to at most 0.025%.

A single one of these optional elements may be added, or two or more of these elements may be added in combination.

B: at most 0.0030%

B markedly increases the hardenability of steel, and in order to obtain this effect with certainty, it is preferable to add at least 0.0005% of B. On the other hand, if the B content exceeds 0.0030%, weldability decreases. Therefore, when B is added, its content is preferably limited to at most 0.0030%. The B content is preferably at least 0.0005% to at most 0.0020%.

Ca: at most 0.005%

Ca has the effect of controlling the form of inclusions and specifically of spheroidizing, thereby preventing hydrogen induced cracking and the occurrence of lamellar tears. However, if the Ca content exceeds 0.005%, its effects saturate. Therefore, when Ca is added, its content is preferably limited to at most 0.005%. The Ca content is preferably at least 0.0005% to at most 0.0040%.

A single one of these optional elements may be added, or both of these may be added in combination.

In addition to the above, the composition of the base metal is Fe and impurities.

In order to achieve a high strength of at least API X70 grade and a high toughness, in addition to the above-described composition, it is extremely important that the carbon equivalent Ceq and the weld cracking parameter Pcm of the base metal and the carbon equivalent Ceq and the weld cracking parameter Pcm of the weld metal be predetermined values. These will be explained below.

Carbon equivalent Ceq of the base metal defined by Equation (1): at least 0.36%.

In order to provide the base metal with a strength of at least API X70 grade, the carbon equivalent Ceq of the base metal defined by the following Equation (1) is made at least 0.36%.

$$Ceq = C + \frac{Mn}{6} + \frac{Cr+Mo+V}{5} + \frac{Cu+Ni}{15} \quad (1)$$

FIG. 1 is a graph showing the relationship between the carbon equivalent Ceq (%) and the strength in the circumferential direction of a pipe (MPa). The strength in the circumferential direction of a pipe for various values of the carbon equivalent Ceq of compositions within the range of the present invention was plotted with the line calculated by the following equation. The straight line parallel to the abscissa in the graph of FIG. 1 shows the target value for the strength in the circumferential direction of a pipe of at least API 5LX70 grade (570 MPa).

Strength in the circumferential direction of a pipe (MPa)=[9.75×carbon equivalent Ceq×100]+255.

It can be seen from this graph that in order to achieve a strength of at least API 5LX70 grade, even if a plate is manufactured by a method using TMCP (thermal-mechanical controlled process), the carbon equivalent Ceq needs to be at least 0.36%.

Particularly in the manufacture of a hot bend pipe, it is known that in a manufacturing process in which quenching is carried out after bending at a temperature of at least 900° C. to at most 1100° C. or in which tempering is carried out with a temperature of at least 300° C. to at most 500° C. at the end of the above-described process, the strength in the circumferential direction decreases by around 10-20 MPa compared to the original strength before heat treatment. Therefore, in order to achieve a strength of at least API 5LX70 grade in a final product in the form of a hot bend pipe, the carbon equivalent Ceq is preferably at least 0.40%.

Weld cracking parameter Pcm of the base metal defined by Equation (2): at most 0.22%.

If the weld cracking parameter Pcm of the base metal defined by the following Equation 2 exceeds 0.22%, high strength and high toughness as well as on-site circumferential weldability cannot be achieved even if heat treatment is carried out. Therefore, the weld cracking parameter Pcm of the base metal defined by the following Equation (2) is made at most 0.22%. The weld cracking parameter Pcm of the base metal is preferably at most 0.19%.

$$Pcm = C + \frac{Si}{30} + \frac{Mn}{20} + \frac{Cu}{20} + \frac{Ni}{60} + \frac{Cr}{20} + \frac{Mo}{15} + \frac{V}{10} + B \quad (2)$$

(Weld Metal)

Weld cracking parameter Pcm of the weld metal defined by Equation (2): at most 0.30%.

If the weld cracking parameter Pcm of the weld metal defined by Equation (2) exceeds 0.30%, the toughness of the weld metal after heat treatment cannot be guaranteed. Therefore, the weld cracking parameter Pcm of the weld metal defined by Equation (2) is at most 0.30%. The weld cracking parameter Pcm of the weld metal is preferably at most 0.29%.

B content of the weld metal: at most 5 ppm, oxygen content of the weld metal: at most 300 ppm The oxygen content and the B content of the weld metal, which have a large effect on the toughness of the weld metal, depend upon the composition of the flux used at the time of welding. The oxygen content of the weld metal is preferably as low as possible. In order to decrease the oxygen content of the weld metal, welding is carried out using a highly basic flux.

If the oxygen content of the weld metal exceeds 300 ppm, the amount of oxides in the weld metal increases, and these oxides become the starting point for fracture and result in a decrease in ductility. Therefore, the oxygen content of the weld metal is limited to at most 300 ppm. The oxygen content of the weld metal is preferably at most 280 ppm.

The basicity of a flux is defined by $(CaO+MgO+BaO+CaF_2+0.5(MnO+FeO))/(SiO_2+0.5(Al_2O_3+TiO_2+ZrO))$. By setting this basicity of the flux to at least 3.0, the oxygen content of the weld metal can be suppressed to at most 300 ppm, whereby target performance can be achieved.

In general, seam weld metal in a straight UOE steel pipe of up to API X70 grade contains around 10-30 ppm of B in order to prevent a decrease in toughness. The presence of B suppresses grain boundary precipitation of ferrite, thereby preventing a decrease in toughness and making it possible to obtain a uniform structure of acicular ferrite. However in a seam weld of a UOE steel pipe of at least API X70 grade, it is advantageous not to add B to the weld metal from the standpoint of toughness. This is because even in the absence of B, grain boundary precipitation of ferrite can be adequately prevented due to the increase in hardenability, and if B is added, the formation of lath structure is promoted, leading to a decrease in toughness.

Figure 2:
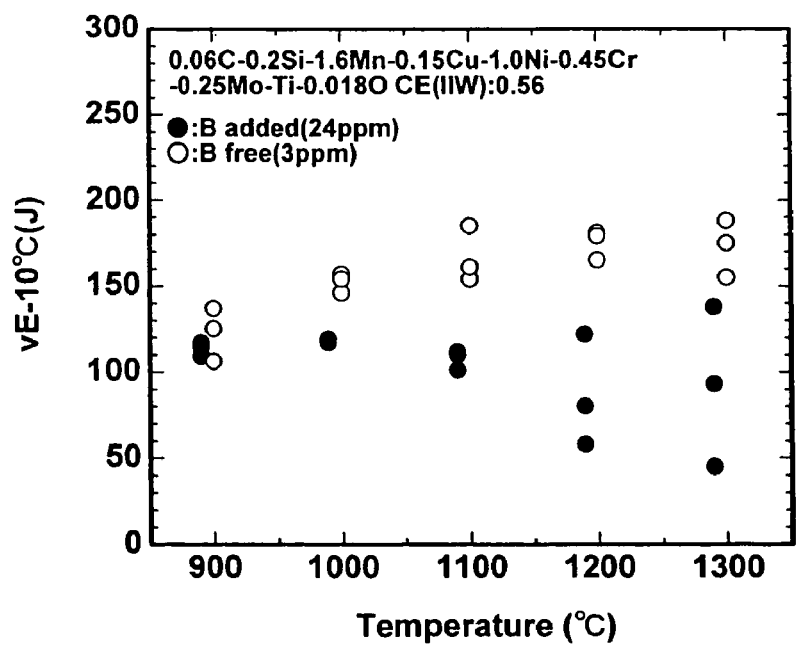
FIG. 2 is a graph showing the results of investigation using a weld metal having a carbon equivalent (IIW) of 0.56% premised on API X100 grade.

FIG. 2 is a graph showing the result of investigation of the absorbed energy vE-10 (° C.) in a Charpy impact test on a weld metal having a carbon equivalent of 0.56% premised on a API X100 grade.

As shown in the graph of FIG. 2, in weld metal containing B (the SOLID CIRCLE mark in FIG. 2), the absorbed energy decreases as the quenching temperature increase, whereas with weld metal not containing B (the CIRCLE mark in FIG. 2), the absorbed energy increases from around 100 J to around 150 J when the quenching temperature is in the range of at least 900° C. to at most 1100° C., and it is a nearly constant value of 150-200 J when the quenching temperature exceeds 1100° C.

From this result, it can be seen that it is preferable not to add B to the weld metal in order to maintain the toughness of weld metal after heat treatment in the strength range corresponding to API X70 grade to X100 grade. This effect is particularly prominent when quenching is carried out at a high temperature exceeding 1000° C.

In this embodiment, a welded steel pipe such as a UOE steel pipe or an RB pipe is used as a material for bending, it is subjected to bending to form a hot bend pipe after heating to a temperature range of at least 900° C. to at most 1100° C., and immediately thereafter it is cooled at a cooling rate of at least 3° C./sec to a temperature range of 300° C. or below, and then tempering is performed thereon in a low-temperature range of at least 300° C. to at most 500° C.

If the heating temperature of a welded steel pipe is less than 900° C., since the heating temperature is lower than or equal to the $Ac_3$ transformation point, it is impossible to attain sufficient strength and toughness due to nonoccurrence of recrystallization. On the other hand, if the heating temperature exceeds 1100° C., austenite grains coarsen leading to a decrease in toughness. Therefore, in this embodiment, the heating temperature of a welded steel pipe is at least 900° C. to at most 1100° C. Taking into consideration variation in manufacturing conditions, the heating temperature is preferably at least 950° C. to at most 1100° C.

A welded steel pipe which is heated in this manner is used as a material for bending. Bending can be carried out by a well known conventional technique, so an explanation of the bending technique will be omitted. For example, bending can be carried out while heating to a predetermined temperature by passing the entire length of a welded steel pipe through a high frequency heating zone.

Bending is carried out so that the weld, which extends in the axial direction of the welded steel pipe, is positioned on the underside of the bend.

The hot bend pipe which underwent bending in this manner is then subjected to heat treatment (quenching and tempering).

Quenching is carried out by performing cooling immediately after bending at a cooling rate of at least 3° C./sec to a temperature range of 300° C. or lower. Taking into consideration variation in manufacturing conditions, the cooling rate is preferably at least 5° C./sec.

As stated above, a major feature of the present invention is that the tempering temperature is decreased. This feature will next be explained.

There have been known techniques in which the quenched pipe is left in an as-quenched state, namely, by omitting tempering, with emphasis on the toughness of weld metal after bending and techniques in which tempering is carried out at a high temperature of at least 550° C. to at most 650° C. with emphasis on strength and toughness after bending.

In contrast, in order to overcome the problems that it is extremely difficult to guarantee the toughness of the weld metal of a hot bend pipe and that the yield strength on the underside of a hot bend pipe decreases, a major feature of the present invention is that tempering is carried out after quenching at a low temperature, namely, by aging.

In general, a high toughness of steel is obtained by performing tempering in a high temperature range of at least 500° C. to less than 650° C. because confined dislocations can freely move in this temperature range. However, this causes a decrease in strength. Dislocations cannot adequately be subjected to pinning simply by precipitation of cementite which always occurs in a low carbon steel. Therefore, in order to prevent a decrease in strength caused by the movement of dislocations, the movement of dislocations is suppressed using precipitation of carbides of V, Nb, Mo, and the like, thereby achieving the desired strength. Precipitation of these carbides takes place only in a high temperature range of at least 500° C. to less than 650° C. Namely, tempering in such a high temperature range has the object of obtaining a fine ferrite structure, thereby obtaining high toughness with maintaining strength.

In contrast, the tempering temperature in the present invention is a low temperature range of at least 300° C. to at most 500° C. In this low temperature range, dislocations cannot move so freely. Therefore, pinning of dislocations can be adequately achieved just by cementite, without need of additional precipitates having a pinning effect. By carrying out tempering in this low temperature range, the yield strength can be increased with almost no decrease in tensile strength. Namely, in the present invention, the desired properties of a hot bend pipe can be achieved without a great increase in costs by increasing the strength of a mother pipe for a hot bend pipe using an appropriately selected composition.

There is a tendency for the properties of a hot bend pipe to somewhat deteriorate when the tempering temperature is in the vicinity of 500° C. Therefore, the tempering temperature is preferably made at least 300° C. to at most 450° C. in order to guarantee the properties of a hot bend pipe.

Thus, the object of tempering in the present invention is totally different from the object of tempering in a high temperature range which has been employed in the prior art.

Next, the effects of decreasing the tempering temperature will be explained more specifically while referring to basic experiments carried out by the present inventors.

As a basic experiment, tempering was carried out at four different tempering temperatures using a straight pipe which did not undergo bending under the conditions described below. A straight pipe heating test can be carried out relatively inexpensively and easily compared to the manufacture of a hot bend pipe, and it is an extremely important and useful basic test for evaluating how the properties of a pipe vary with the tempering temperature.

The straight pipe used in this test was a steel pipe with an outer diameter of 1016 mm and a wall thickness of 20 mm. The compositions of the steel pipe and the weld metal are shown in Table 1. The mechanical properties of the steel pipe are shown in Table 2.

TABLE 1

| Base Metal | | | | | | | | Weld metal (wt %) |
|---|---|---|---|---|---|---|---|---|
| C | Si | Mn | S | Others | Ceq | Pcm | | Pcm |
| .07 | .14 | 1.55 | .0020 | Cu, Ni, Cr, Mo, Nb, V, Ti | .39 | .19 | | .20 |

TABLE 2

| Base metal | | | | Weld metal | | Heat affected zone | |
|---|---|---|---|---|---|---|---|
| Tensile test | | | Charpy test | Charpy test | | Charpy test | |
| YS (MPa) | TS (MPa) | YR (%) | energy (J) | energy (J) | SA (%) | energy (J) | SA (%) |
| 583 | 641 | 91.0 | 289 | 123 | 98 | 206 | 97 |

SA: shear area (% ductile fracture); Charpy test temperature: −20° C.

As shown in Table 2, the mechanical properties of the base metal in the circumferential direction were tensile strength TS of 641 MPa, yield strength YS of 583 MPa, and yield ratio YR of 91.0%, and its toughness was an absorbed energy $vE_{-20}$ of 289 J at a Charpy test temperature of −20° C. The toughness of the weld metal was an absorbed energy $vE_{-20}$ of 123 J at a Charpy test temperature of −20° C., and the toughness of the heat affected zone was an absorbed energy $vE_{-20}$ of 206 J at a Charpy test temperature of −20° C.

After a steel pipe having the above-described properties was heated to 1000° C., it was water cooled to a temperature of 300° C. or lower such that the cooling rate at the center in the thickness direction of the pipe was 13° C./sec and then it was allowed to cool to room temperature.

Subsequently, as shown in Table 3, the pipe was subjected to a straight pipe heating test without tempering or with four different tempering temperatures (300° C., 400° C., 500° C. or 550° C.). The holding time at each tempering temperature was selected on the basis of one hour per inch (25.4 mm). Therefore, holding at each tempering temperature was carried out for approximately 47 minutes for this test pipe having a wall thickness of 20 mm.

Table 3 shows the strength and toughness of the base metal, the toughness of the weld metal, and the toughness of the heat affected zone measured at a test temperature of room temperature using a plate-shaped tensile test piece prescribed by API and a Charpy test piece measuring 10 mm×10 mm with a 2 mm V-notch for measuring toughness.

As can be seen from Tables 2 and 3, in the as-quenched state, the tensile strength TS was decreased by approximately 30 MPa from the tensile strength TS of the mother pipe before quenching with the yield strength YS being extremely decreased.

By subjecting this quenched mother pipe to tempering in a low temperature range not exceeding 500° C., the yield strength YS was markedly increased while the tensile strength and toughness of the base metal both maintained high performance. At the same time, the toughness of the weld metal maintained a target shear area at −20° C. ($SA_{-20}$) and that a high level of toughness could be maintained.

Thus, a process according to the present invention which carries out tempering in a low temperature range is extremely effective for controlling a hot bend pipe to obtain target performance. Namely, the tempering temperature greatly affects the performance of a hot bend pipe formed by bending a welded steel pipe having an appropriate composition in a hot state.

If tempering is carried out in a high temperature range exceeding 500° C. as in the past, although the toughness of the base metal recovers, the toughness of the weld metal deteriorates and the strength of the base metal also decreases. In order to guarantee the strength of a final product in the form of a hot bend pipe in a conventional manufacturing process, it is necessary to compensate for the decrease in strength in the bending step by increasing the strength of the mother welded steel pipe (straight pipe) which is used to form the hot bend

TABLE 3

| | | Base metal | | | | Weld metal | | Heat affected zone | |
|---|---|---|---|---|---|---|---|---|---|
| | | Tensile test | | | Charpy test | Charpy test | | Charpy test | |
| | Tempering temp. (° C.) | YS (MPa) | TS (MPa) | YR (%) | energy (J) | energy (J) | SA (%) | energy (J) | SA (%) |
| | As-quenched | 449 | 616 | 85.6 | 281 | 151 | 70 | 270 | 100 |
| 1 | 300 | 486 | 621 | 78.2 | 292 | 154 | 81 | 265 | 98 |
| 2 | 400 | 500 | 604 | 82.8 | 292 | 143 | 83 | 267 | 100 |
| 3 | 500 | 520 | 597 | 87.1 | 301 | 144 | 52 | 283 | 99 |
| 4 | 550 | 521 | 567 | 91.9 | 323 | 97 | 39 | 292 | 100 |
| | Target | ≧485 | ≧570 | ≦93.0 | ≧80 | ≧40 | ≧50 | ≧40 | ≧50 | pipe in anticipation of this decrease in strength. Doing so is extremely disadvantageous from the standpoint of manufacturing costs.

In contrast to the prior art process, in the present invention, after a welded steel pipe undergoes hot bending at a temperature of at least 900° C. to at most 1100° C. to form a hot bend pipe, quenching is performed followed by tempering in a low temperature range of at least 350° C. to at most 500° C. As a result, a decrease in the toughness of the weld metal and a decrease in the yield strength of the underside of the hot bend pipe, which are particular problems of hot bend pipes, can both be avoided.

In the past, there were no inventions which focused on the strength of the underside of a bend, which most decreases in yield strength after bending, and no consideration was given to the performance of the underside of the hot bend pipe which is actually carried out as a final evaluation test of a hot bend pipe. In contrast, in the present invention, these problems can be simultaneously solved by tempering at a low temperature.

In an actual hot bend pipe, in order to satisfy the requirements for API 5LX70 grade even on the underside (the side undergoing compressive deformation) of a bend, it is sufficient to make the tensile strength of a welded steel pipe used for bending at least the value calculated by [485 MPa (the lower limit of the yield strength of API X70 grade)]/[0.78 (the minimum value of the yield ratio of the underside of a bend)]=621 MPa. In contrast, with a conventional hot bend pipe manufactured in an as-quenched state, the yield strength became extremely low due to omission of tempering, so it was necessary for a welded steel pipe used for bending to have a tensile strength far higher than the value in this embodiment. With a hot bend pipe manufactured by high temperature tempering at 500° C. or above, although the yield strength increased, the tensile strength greatly decreased. Therefore, in this case as well, it was necessary for the tensile strength of the welded steel pipe to be far higher than the above-described value. In any of the prior processes, it was necessary to considerably increase the strength of the welded steel pipe used for bending, and this was extremely disadvantageous from the standpoint of manufacturing costs.

The above-mentioned minimum value of the yield ratio of the underside of a bend varies with the steel composition, the heat treatment temperature, and the strength of the hot bend pipe. It also varies with the degree of bending and the like. Therefore, it is difficult to set it straightway. However, a target value for the tensile strength of the base metal of the welded steel pipe can be set using a minimum yield ratio predicted based on past manufacturing experience. In addition, when the cooling rate in the heat treatment step for the hot bend pipe is lower than the cooling rate when manufacturing a steel plate which is the material for the welded steel pipe, the target tensile strength of the welded steel pipe is preferably increased in accordance with the difference in the cooling rate.

Namely, in this embodiment, a welded steel pipe for bending is manufactured such that it has a tensile strength which is equal to or higher than the lower limit of the yield strength of a hot bend pipe of API X70 grade divided by the minimum value of the yield ratio of the underside of the bend taking the cooling rate during heat treatment of the hot bend pipe into consideration, and bending is carried out on this welded steel pipe.

Example 1

The present invention will be illustrated while referring to examples.

A UOE steel pipe having a base metal in which the composition, carbon equivalent Ceq, and weld cracking parameter Pcm are shown in Table 4 and having a weld metal in which the weld cracking parameter Pcm, the B content, and the O content are shown in Table 4 was heated to the heating temperature shown in Table 4 and underwent bending. Welding of the UOE steel pipe was carried out by seam welding using a highly basic flux which did not contain boron and which had the basicity shown in Table 4.

TABLE 4

| | | | | | | | Base metal | | | | | | | |
|---|---|---|---|---|---|---|---|---|---|---|---|---|---|---|---|
| | C | Si | Mn | S | Cu | Ni | Cr | Mo | Nb | V | Ti | Ca | Al | N | B |
| | | | | | | | | (wt %) | | | | | | | |
| 1 | .08 | .21 | 1.80 | .0015 | — | — | — | — | — | — | — | — | .023 | .0038 | — |
| 2 | .13 | .25 | 1.40 | .0024 | — | — | — | — | — | — | — | — | .018 | .0032 | — |
| 3 | .08 | .60 | 1.80 | .0022 | — | — | — | — | — | — | — | — | .020 | .0029 | — |
| 4 | .12 | .45 | 1.35 | .0024 | — | — | — | — | — | — | — | — | .024 | .0034 | — |
| 5 | .04 | .05 | 2.30 | .0024 | — | — | — | — | — | — | — | — | .038 | .0042 | — |
| 6 | .08 | .21 | 1.80 | .0100 | — | — | — | — | — | — | — | — | .033 | .0032 | — |
| 7 | .12 | .25 | 1.30 | .0015 | — | — | — | — | — | — | — | — | .034 | .0039 | — |
| 8 | .12 | .25 | 1.80 | .0015 | — | — | — | — | — | — | — | — | .041 | .0042 | — |
| 9 | .08 | .21 | 1.80 | .0015 | — | — | — | — | — | — | — | — | .023 | .0032 | — |
| 10 | .08 | .21 | 1.80 | .0015 | | | | | | | | | .033 | .0024 | — |
| 11 | .08 | .21 | 1.80 | .0015 | — | — | — | — | — | — | — | — | .023 | .0033 | — |
| 12 | .08 | .21 | 1.80 | .0015 | — | — | — | — | — | — | — | — | .034 | .0023 | — |
| 13 | .08 | .21 | 1.80 | .0015 | — | — | — | — | — | — | — | — | .023 | .0024 | — |
| 14 | .08 | .21 | 1.80 | .0015 | — | — | — | — | — | — | — | — | .025 | .0033 | — |
| 15 | .08 | .21 | 1.80 | .0015 | — | — | — | — | — | — | — | — | .031 | .0039 | — |
| 16 | .08 | .21 | 1.80 | .0015 | — | — | — | — | — | — | — | — | .033 | .0042 | — |
| 17 | .08 | .21 | 1.80 | .0015 | — | — | — | — | — | — | — | — | .032 | .0045 | — |
| 18 | .08 | .21 | 1.80 | .0015 | — | — | — | — | — | — | — | — | .030 | .0022 | — |
| 19 | .08 | .21 | 1.80 | .0015 | — | — | — | — | — | — | — | — | .035 | .0023 | — |
| 20 | .08 | .21 | 1.80 | .0015 | — | — | — | — | — | — | — | — | .029 | .0033 | — |
| 21 | .05 | .15 | 1.95 | .0010 | .40 | .65 | .20 | — | .010 | — | .012 | — | .033 | .0024 | — |
| 22 | .04 | .21 | 1.50 | .0010 | .30 | .60 | .30 | .40 | .020 | .030 | .010 | — | .034 | .0022 | .0010 |
| 23 | .08 | .21 | 1.80 | .0015 | .35 | .20 | — | — | — | — | — | — | .034 | .0033 | — |
| 24 | .08 | .21 | 1.80 | .0015 | — | — | .20 | — | — | — | — | — | .032 | .0035 | — |
| 25 | .08 | .21 | 1.80 | .0015 | — | — | — | .15 | — | — | — | — | .030 | .0032 | — |

TABLE 4-continued

| | | | | | | | | | | | | | | | |
|---|---|---|---|---|---|---|---|---|---|---|---|---|---|---|---|
| 26 | .08 | .21 | 1.80 | .0015 | — | — | — | — | .035 | — | — | — | .038 | .0023 | — |
| 27 | .08 | .21 | 1.80 | .0015 | — | — | — | — | — | .035 | — | — | .032 | .0025 | — |
| 28 | .08 | .21 | 1.80 | .0015 | — | — | — | — | — | — | .012 | — | .023 | .0044 | — |
| 29 | .08 | .21 | 1.80 | .0015 | — | — | — | — | — | — | — | .002 | .023 | .0042 | — |
| 30 | .08 | .21 | 1.80 | .0015 | — | — | — | — | — | — | — | — | .029 | .0029 | .0010 |
| 31 | .08 | .21 | 1.80 | .0015 | .15 | .15 | .15 | — | .020 | — | .012 | — | .034 | .0033 | — |

| | Base metal | | Flux | Weld metal | | | Heating temp. | Cooling rate | Tempering temp. |
|---|---|---|---|---|---|---|---|---|---|
| | Ceq (%) | Pcm (%) | basicity (%) | Pcm (%) | O (ppm) | B (ppm) | at ½ t (° C.) | at ½ t (° C./S) | at ½ t (° C.) |
| 1 | .39 | .18 | 3.8 | .20 | 220 | 3 | 1000 | 15 | 400 |
| 2 | .40 | .22 | 3.6 | .19 | 232 | 2 | 1000 | 15 | 400 |
| 3 | .40 | .20 | 3.2 | .23 | 202 | 1 | 1000 | 15 | 400 |
| 4 | .36 | .21 | 3.6 | .19 | 215 | 1 | 1000 | 15 | 400 |
| 5 | .44 | .17 | 3.1 | .21 | 244 | 1 | 1000 | 15 | 400 |
| 6 | .41 | .20 | 3.4 | .19 | 233 | 2 | 1000 | 15 | 400 |
| 7 | .35 | .19 | 3.4 | .21 | 246 | 3 | 1000 | 15 | 400 |
| 8 | .44 | .23 | 3.5 | .20 | 212 | 2 | 1000 | 15 | 400 |
| 9 | .40 | .20 | 3.7 | .31 | 209 | 2 | 1000 | 15 | 400 |
| 10 | .39 | .18 | 2.0 | .20 | 320 | 1 | 1000 | 15 | 400 |
| 11 | .39 | .18 | 4.5 | .20 | 198 | 2 | 850 | 15 | 400 |
| 12 | .39 | .18 | 3.8 | .20 | 218 | 2 | 900 | 15 | 400 |
| 13 | .39 | .18 | 3.2 | .20 | 245 | 1 | 1100 | 15 | 400 |
| 14 | .39 | .18 | 3.8 | .20 | 232 | 3 | 1130 | 15 | 400 |
| 15 | .39 | .18 | 3.9 | .20 | 212 | 2 | 1000 | 2 | 400 |
| 16 | .39 | .18 | 4.6 | .20 | 198 | 2 | 1000 | 3 | 400 |
| 17 | .39 | .18 | 3.2 | .20 | 244 | 1 | 1000 | 15 | 250 |
| 18 | .39 | .18 | 3.8 | .20 | 220 | 2 | 1000 | 15 | 300 |
| 19 | .39 | .18 | 3.9 | .20 | 220 | 2 | 1000 | 15 | 500 |
| 20 | .39 | .18 | 4.2 | .20 | 212 | 2 | 1000 | 15 | 550 |
| 21 | .50 | .21 | 4.5 | .24 | 200 | 1 | 1000 | 15 | 400 |
| 22 | .51 | .20 | 4.7 | .27 | 180 | 1 | 1000 | 15 | 400 |
| 23 | .42 | .20 | 3.9 | .20 | 220 | 1 | 1000 | 15 | 400 |
| 24 | .43 | .19 | 4.0 | .20 | 220 | 1 | 1000 | 15 | 400 |
| 25 | .41 | .19 | 4.0 | .20 | 220 | 1 | 1000 | 15 | 400 |
| 26 | .39 | .18 | 4.0 | .20 | 232 | 1 | 1000 | 15 | 400 |
| 27 | .39 | .19 | 3.9 | .20 | 210 | 1 | 1000 | 15 | 400 |
| 28 | .39 | .19 | 3.7 | .20 | 218 | 1 | 1000 | 15 | 400 |
| 29 | .39 | .19 | 3.9 | .20 | 218 | 1 | 1000 | 15 | 400 |
| 30 | .39 | .20 | 4.0 | .20 | 232 | 1 | 1000 | 15 | 400 |
| 31 | .43 | .20 | 3.9 | .20 | 241 | 2 | 1000 | 15 | 400 |

Immediately after bending, the steel pipe was cooled at the cooling rate shown in Table 4 to a temperature range of 300° C. or lower, and then was tempered at the temperature shown in Table 4.

The cooling rate in Table 4 indicates the cooling rate at the center in the thickness direction of the pipe (½t), and similarly the tempering temperature indicates the temperature at the center in the thickness direction of the pipe.

In this example, the tempering time was based on one hour per inch (25.4 mm), and so was 60 minutes×20 mm/25.4 mm=47 minutes.

The above standard is preferably employed when manufacturing hot bend pipes having other wall thicknesses. The reason for prescribing the tempering time is that productivity markedly decreases if the tempering time is too long, but a minimum necessary time exists in order to obtain the effect of uniform tempering to the interior of the wall thickness. Accordingly, a suitable tempering time is up to ±20% of the holding time calculated from the above standard.

The properties of the underside of the bend of the resulting hot bend pipe (YS, TS, YR, $vE_{-20}$), the properties of the weld metal ($vE_{-20}$, $SA_{-20}$), and the properties of the heat affected zone ($vE_{-20}$, $SA_{-20}$) were measured. The results are compiled in Table 5.

TABLE 5

| | Properties of underside of bend | | | | Properties of weld metal | | Properties of heat affected zone | |
|---|---|---|---|---|---|---|---|---|
| | YS (MPa) | TS (MPa) | YR (%) | VE-20 (J) | vE-20 (J) | SA-20 (%) | vE-20 (J) | SA-20 (%) |
| 1 | 501 | 625 | 80.2 | 184 | 152 | 78 | 179 | 96 |
| 2 | 530 | 645 | 82.2 | 120 | 88 | 47 | 98 | 38 |
| 3 | 522 | 613 | 85.2 | 245 | 128 | 76 | 78 | 29 |
| 4 | 425 | 561 | 75.8 | 118 | 75 | 52 | 117 | 51 |
| 5 | 538 | 578 | 93.1 | 124 | 100 | 52 | 89 | 53 |

TABLE 5-continued

| | Properties of underside of bend | | | | Properties of weld metal | | Properties of heat affected zone | |
|---|---|---|---|---|---|---|---|---|
| | YS (MPa) | TS (MPa) | YR (%) | VE-20 (J) | vE-20 (J) | SA-20 (%) | vE-20 (J) | SA-20 (%) |
| 6 | 537 | 647 | 83.0 | 80 | 29 | 39 | 71 | 28 |
| 7 | 444 | 551 | 80.6 | 279 | 138 | 67 | 282 | 94 |
| 8 | 545 | 662 | 82.3 | 123 | 67 | 49 | 51 | 38 |
| 9 | 493 | 640 | 77.0 | 179 | 64 | 32 | 150 | 92 |
| 10 | 501 | 644 | 77.8 | 165 | 82 | 45 | 165 | 92 |
| 11 | 500 | 569 | 87.9 | 182 | 187 | 77 | 175 | 88 |
| 12 | 499 | 577 | 86.5 | 231 | 182 | 80 | 210 | 85 |
| 13 | 511 | 640 | 79.8 | 186 | 98 | 56 | 145 | 61 |
| 14 | 515 | 670 | 76.9 | 129 | 64 | 47 | 178 | 49 |
| 15 | 422 | 560 | 75.4 | 90 | 68 | 62 | 131 | 42 |
| 16 | 470 | 571 | 82.3 | 103 | 89 | 55 | 111 | 51 |
| 17 | 467 | 629 | 74.2 | 299 | 142 | 89 | 289 | 91 |
| 18 | 490 | 628 | 78.0 | 278 | 177 | 76 | 262 | 92 |
| 19 | 523 | 615 | 85.0 | 256 | 123 | 70 | 263 | 96 |
| 20 | 500 | 600 | 83.3 | 311 | 89 | 47 | 256 | 58 |
| 21 | 645 | 732 | 88.1 | 201 | 115 | 70 | 138 | 80 |
| 22 | 711 | 859 | 82.8 | 128 | 132 | 65 | 142 | 74 |
| 23 | 531 | 641 | 82.8 | 232 | 183 | 81 | 192 | 90 |
| 24 | 526 | 631 | 83.4 | 179 | 160 | 82 | 174 | 90 |
| 25 | 501 | 652 | 76.8 | 130 | 126 | 72 | 105 | 71 |
| 26 | 526 | 626 | 84.0 | 191 | 126 | 78 | 197 | 73 |
| 27 | 529 | 621 | 85.2 | 195 | 131 | 76 | 182 | 75 |
| 28 | 509 | 631 | 80.7 | 186 | 151 | 80 | 201 | 78 |
| 29 | 503 | 625 | 80.5 | 256 | 182 | 81 | 271 | 82 |
| 30 | 551 | 669 | 82.4 | 122 | 83 | 89 | 109 | 81 |
| 31 | 575 | 737 | 78.0 | 198 | 138 | 76 | 158 | 77 |
| | ≧485 | ≧570 | ≦93.0 | ≧84 | ≧48 | ≧50 | ≧48 | ≧50 |

Samples 1, 12, 13, 16, 18, 19, and 21-31 in Tables 4 and 5 are examples of the present invention which satisfy all of the conditions defined by the present invention. In contrast, Samples 2-11, 14, 15, 17, and 20 are comparative examples in which at least one of the composition and manufacturing conditions does not satisfy the conditions defined by the present invention.

In this example, the strength and the toughness of the underside of the bend, the toughness of the weld metal in the bend, and the toughness of the heat affected zone of the bend were set to the following target values. Namely, the strength and the toughness of the underside of the bend were made the values presently prescribed for API 5LX70 grade (YS of at least 485 MPa, TS of at least 570 MPa, and YR of at most 93.0%), and the absorbed energy at −20° C., $vE_{-20}$, in a Charpy test for the base metal, the weld metal, the heat affected zone in the bend was set to at least 84 J, at least 48 J, and at least 48 J, respectively, from the standpoint of prevention of brittle fracture.

From Tables 4 and 5, it can be seen that Samples 1, 12, 13, 16, 18, 19, and 21-31 which were examples of the present invention could adequately achieve the target properties, whereas Samples 2-11, 14, 15, 17, and 20 which were comparative examples could not achieve all the target properties.

From the results shown in Tables 4 and 5, it can be seen that the heating temperature for a mother pipe for bending is preferably at least 950° C. to most 1100° C. taking into consideration variations in manufacturing conditions. Similarly, the cooling rate is preferably at least 5° C./sec. A tendency for deterioration is observed with tempering in the vicinity of 500° C., so the tempering temperature is preferably at least 300° C. to at most 450° C.

The invention claimed is:

1. A hot bend pipe for line pipe and having a strength of at least API X70 which is manufactured by carrying out bending of a welded steel pipe after heating to a temperature of at least 900° C. to at most 1100° C. and which has a quenched and tempered structure obtained by cooling after the bending at a cooling rate of at least 3° C. per second to a temperature range of 300° C. or lower followed by tempering in a temperature range of 300-500° C., characterized in that the base metal has a composition comprising, in mass percent, C: 0.03-0.12%, Si: 0.05-0.50%, Mn: 1.4-2.2%, S: at most 0.0050%, Al: at most 0.06%, N: at most 0.0070%, and a remainder of Fe and impurities, with the carbon equivalent (Ceq) defined by Equation (1) being at least 0.36% and the weld cracking parameter (Pcm) defined by Equation (2) being at most 0.22%, and that the weld metal has a weld cracking parameter (Pcm) defined by Equation (2) of at most 0.30%, a B content of at most 5 ppm, and an oxygen content of at most 300 ppm:

$$Ceq = C + \frac{Mn}{6} + \frac{Cr + Mo + V}{5} + \frac{Cu + Ni}{15} \quad (1)$$

$$Pcm = C + \frac{Si}{30} + \frac{Mn}{20} + \frac{Cu}{20} + \frac{Ni}{60} + \frac{Cr}{20} + \frac{Mo}{15} + \frac{V}{10} + B. \quad (2)$$

2. A hot bend pipe as set forth in claim 1 wherein the base metal further contains, in mass percent, at least one of Cu: at most 1.0%, Ni: at most 2.0%, Cr: at most 1.0%, Mo: at most 1.0%, Nb: at most 0.1%, V: at most 0.1%, and Ti: at most 0.03%.

3. A hot bend pipe as set forth in claim 1 wherein the base metal further contains at most 0.0030 mass percent of B.

4. A hot bend pipe as set forth in claim 1, wherein the base metal further contains at most 0.005 mass percent of Ca.

5. A hot bend pipe as set forth in claim 2 wherein the base metal further contains at most 0.0030 mass percent of B.

6. A hot bend pipe as set forth in claim 2, wherein the base metal further contains at most 0.005 mass percent of Ca.

7. A hot bend pipe as set forth in claim 3, wherein the base metal further contains at most 0.005 mass percent of Ca.

8. A process for manufacturing a hot bend pipe characterized by heating a welded steel pipe having a base metal and a weld metal which satisfy the following conditions to a temperature range of 900-1100° C. and performing bending, then immediately cooling to a temperature range of 300° C. or lower at a cooling rate of at least 3° C./sec, and then performing tempering in a temperature range of 300-500° C.:

base metal: a composition, in mass percent of C: 0.03-0.12%, Si: 0.05-0.50%, Mn: 1.4-2.2%, S: at most 0.0050%, Al: at most 0.06%, N: at most 0.0070%, and a remainder of Fe and impurities, wherein the carbon equivalent (Ceq) defined by Equation (1) is at least 0.36% and the weld cracking parameter (Pcm) defined by Equation (2) is at most 0.22%, and weld metal: the weld cracking parameter (Pcm) defined by Equation (2) is at most 0.30%, the B content is at most 5 ppm, and the oxygen content is at most 300 ppm:

$$Ceq = C + \frac{Mn}{6} + \frac{Cr + Mo + V}{5} + \frac{Cu + Ni}{15} \quad (1)$$

$$Pcm = C + \frac{Si}{30} + \frac{Mn}{20} + \frac{Cu}{20} + \frac{Ni}{60} + \frac{Cr}{20} + \frac{Mo}{15} + \frac{V}{10} + B. \quad (2)$$

9. A process for manufacturing a hot bend pipe as set forth in claim 8 wherein the base metal further contains, in mass percent, at least one of Cu: at most 1.0%, Ni: at most 2.0%, Cr: at most 1.0%, Mo: at most 1.0%, Nb: at most 0.1%, V: at most 0.1%, and Ti: at most 0.03%.

10. A process for manufacturing a hot bend pipe as set forth in claim 8 wherein the base metal further contains at most 0.0030 mass percent of B.

11. A process for manufacturing a hot bend pipe as set forth in claim 8 wherein the base metal further contains at most 0.005 mass percent of Ca.

12. A process for manufacturing a hot bend pipe as set forth in claim 8 wherein the welded steel pipe is a UOE steel pipe or a weld pipe for roll bending.

13. A process for manufacturing a hot bend pipe as set forth in claim 9 wherein the base metal further contains at most 0.0030 mass percent of B.

14. A process for manufacturing a hot bend pipe as set forth in claim 9 wherein the base metal further contains at most 0.005 mass percent of Ca.

15. A process for manufacturing a hot bend pipe as set forth in claim 10 wherein the base metal further contains at most 0.005 mass percent of Ca.

16. A process for manufacturing a hot bend pipe as set forth in claim 9 wherein the welded steel pipe is a UOE steel pipe or a weld pipe for roll bending.

17. A process for manufacturing a hot bend pipe as set forth in claim 10 wherein the welded steel pipe is a UOE steel pipe or a weld pipe for roll bending.

18. A process for manufacturing a hot bend pipe as set forth in claim 11 wherein the welded steel pipe is a UOE steel pipe or a weld pipe for roll bending.

\* \* \* \* \*